United States Patent [19]

Frymiare

[11] Patent Number: 5,551,539
[45] Date of Patent: Sep. 3, 1996

[54] TRAILER SURGE BRAKE ACTUATOR

[75] Inventor: Brian E. Frymiare, North East, Md.

[73] Assignee: The United States of America as represented by the Secretary of the Army, Washington, D.C.

[21] Appl. No.: 441,558

[22] Filed: May 16, 1995

[51] Int. Cl.⁶ ........................................................ B60T 7/20
[52] U.S. Cl. ........................................ 188/112 R; 188/3 H
[58] Field of Search ............................... 188/112 R, 3 H, 188/3 R, 142, 149, 125, 126, 150; 303/7; 280/446.1, 447, 432, 455.1, 456.1, 460.1, 428

[56] References Cited

U.S. PATENT DOCUMENTS

| | | | |
|---|---|---|---|
| 1,896,427 | 2/1933 | Selvester | 188/112 R |
| 2,125,702 | 5/1937 | Watson . | |
| 2,152,017 | 3/1939 | Banning . | |
| 2,630,888 | 3/1953 | Fikse | 188/112 R |
| 2,698,069 | 12/1954 | Henry | 188/112 R |
| 2,993,568 | 8/1961 | Henry . | |
| 3,026,975 | 3/1962 | Yoder . | |
| 3,072,223 | 1/1963 | Yoder . | |
| 3,570,633 | 3/1971 | Garnett | 280/428 |
| 3,870,128 | 3/1975 | Nicolay et al. | 188/112 R |
| 3,880,263 | 4/1975 | Ewald et al. | 188/142 X |
| 3,881,577 | 5/1975 | Wherry . | |
| 3,892,296 | 7/1975 | DePuydt et al. | 188/112 R |
| 4,249,643 | 2/1981 | Yoder . | |
| 4,856,621 | 8/1989 | Yoder . | |
| 4,889,212 | 12/1989 | Temple . | |

*Primary Examiner*—Douglas C. Butler
*Attorney, Agent, or Firm*—William R. Medsger; Saul Elbaum

[57] ABSTRACT

A trailer surge brake actuator comprises a plurality of stacked slider assemblies. At least one rigid first tubular body is affixed by suitable means to the front end of a trailer. A first rigid cylinder slider attached to the towing vehicle extends longitudinally and reciprocates inside the first tubular body. Attached to the first slider is a rigid member connecting the first slider with at least one second cylinder slider which reciprocates within a second tubular body attached to the top of the first tubular body. The rigid member prevents the first and second sliders from rotating when the towing vehicle's pintle rotates. The second slider's end within the second tubular body is in contact with a pushrod that actuates a brake master cylinder attached to the aft end of the second tubular body. When the towing vehicle decelerates to such an extent that the trailer commences to overrun the towing vehicle, the first slider moves into the first tubular body, simultaneously forcing the second slider into the second tubular body while actuating the master cylinder and the trailer wheel brakes.

6 Claims, 4 Drawing Sheets

TRAILER SURGE BRAKE ACTUATOR

BACKGROUND OF THE INVENTION

1. Field of the Invention

This invention relates to surge or reaction-type trailer brakes, and more particularly to a trailer brake actuator with an improved slider arrangement that can withstand the rigors of movement over rough terrain when attached to a towing vehicle with a rotatable pintle.

2. Description of the Related Art

Surge brakes utilize the differential inertia between a towing vehicle and a towed trailer to mechanically displace fluid from a hydraulic brake master cylinder assembly actuating the brakes attached to the wheels of the trailer resulting in the deceleration of the trailer. One type of surge brake consists of a telescopic slider assembly affixed to the trailer and attached to a connector on the towing vehicle. When the towing vehicle brakes, the speed of the trailer exceeds the speed of the towing vehicle and the trailer attempts to "overrun" the towing vehicle. The momentum of the trailer causes the slider assembly to telescope inward thus causing the distance between the towing vehicle and the trailer to lessen. This movement results in the displacement of fluid in the brake master cylinder attached to the slider assembly, which actuates the trailer's brakes and slows the trailer. As the trailer slows and the slider assembly telescopes outward again, the movement results in the reduction of pressure in the braking system and ultimately effectuating complete disengagement of the trailer brakes.

Brake master cylinder assemblies that can be used on trailer surge brake actuators are well known in the prior art. Some brake master cylinders are rather rudimentary and cause the trailer to brake whenever the distance between the towing vehicle and the trailer is reduced to a predetermined distance. The disadvantage of this limitation is apparent when the towing vehicle is backing up. When the towing vehicle is backing up, the weight of the trailer may cause the slider assembly to telescope inward causing the actuation of the trailer brakes. This problem, however, is easily overcome by brake master cylinder assemblies configured to release the pressure in the brake system when the pressure reaches a predetermined amount or when the relative movement of the actuator parts exceeds a predetermined distance. A third type of brake master cylinder assembly combines the functions of the first two, but also allows braking in the reverse direction under some circumstances, such as for holding the trailer on a hill. All three of these brake master cylinders are well known in the prior art and each can be used with the present invention.

Also well known in the prior art are emergency breakaway features used on surge brakes which actuate the trailer brakes if the trailer becomes unexpectedly detached from the towing vehicle. Normally, the breakaway feature consists of a cable attached at one end to the towing vehicle and affixed at the other end of the cable to a pivotal lever attached to the mechanical linkage whose movement displaces the fluid in the brake master cylinder assembly. When the trailer coupling becomes detached from the towing vehicle and the distance between the towing vehicle and the trailer exceeds the length of the cable, the cable becomes taut and pulls the lever forward forcing the mechanical linkage to move into the brake master cylinder and displacing fluid from the brake master cylinder assembly resulting in the application of the trailer wheel brakes.

Although surge brakes are most often used on cargo or boat trailers, they are not limited to these applications. Surge brakes are equally applicable for use with other objects that are towed, such as motor homes or other motor vehicles.

The use of surge brakes on military trailers presents unique problems. Unlike commercial towing vehicles which have fixed coupling means attached to the towing vehicles, military vehicles have rotatable pintles. Rotatable pintles are a safety feature required by military specifications. The rotatable pintle can prevent the towing vehicle from "tipping over" if the trailer "tips over". Military trailers are prone to tipping over for a variety of reasons, such as use on uneven terrain at high speeds with frequent drastic maneuvers, improper cargo load distribution, and high ground clearance with a high center of gravity. The rotatable pintle rotates if the trailer tips over, thus, preventing the towing vehicle from tipping over also. If the pintle were not rotatable, the towing vehicle could also tip over under some circumstances. Military operational requirements also dictate that trailers withstand the rigors of extreme off-road use, far in excess of that placed upon commercial trailers.

The U.S. Army is currently developing and testing a suitable trailer for its High Mobility Multipurpose Wheeled Vehicle (HMMWV). Unlike other military trailers with hydraulic brakes, the new trailer must be capable of a gross vehicle weight (GVW) of up to 4200 pounds. Several commercially available surge brakes were tested for use on military trailers and proved unsatisfactory for military use. One common problem was that the telescoping slider assemblies and the mechanical linkages connected them to the brake master cylinder assemblies could not withstand the rigors of military cross country terrain use under such heavy loads.

Another major problem encountered was that the rotational movement of the pintle under normal military towing circumstances caused premature and uneven wear and failure of the surge brake assemblies. The pintle rotates to varying degrees when the trailer travels over uneven surfaces. The surge brakes tested had rather rudimentary anti-rotational devices attached to the surge brake to prevent premature wear of the slider assembly caused by the rotation of the slider assembly when the pintle rotated. On the surge brakes tested, the anti-rotational devices consisted of some type of metal L-shaped member with one end fixed to the slider and the other end inserted into a aperture that needed to be cut in the trailer frame directly below the slider assembly upon which the surge brake was affixed. The function of the L-shape member was to act like a positive lock whenever the pintle rotated and the L-shaped member moved slightly in the direction of rotation and came in contact with the side of the trailer frame surface on the periphery of the aperture. These rudimentary anti-rotational devices proved unsatisfactory. The end of the L-shaped member extending into the trailer frame wore prematurely because of the slight rotational movement of the L-shaped member, the abrasive nature of the operating environment (sand, dust, mud, etc.), and the extreme forces exerted upon it whenever the pintle on the towing vehicle rotated. Also, the slight movement of the L-shaped member permitted the slider to rotate slightly also, which caused premature and uneven wear on the slider assembly.

Therefore, there remains a need for a suitable surge brake actuator that overcomes the shortcomings identified above. Furthermore, the surge brake actuator for use on military trailers must not require more than minimal maintenance, must withstand the environmental rigors of military operations and must be easily mounted on a wide variety of trailers. The present invention satisfies these needs.

SUMMARY OF THE INVENTION

The present invention overcomes the disadvantages in the prior art through a simple, relatively low cost, minimal maintenance design. The present invention comprises a plurality of stacked slider assemblies. The invention employs at least one rigid first tubular body affixed by suitable means to the front end of the trailer parallel to the movement of the trailer. Inside the first tubular body is a first rigid cylinder slider which extends longitudinally and reciprocates inside the first tubular body. The first slider extends beyond the opening of the first tubular body facing the towing vehicle. Attached to this protruding end of the slider is a connector for attachment to the towing vehicle.

Also attached to the protruding end of the first slider is a rigid member extending upward and attached to at least one second cylinder slider which reciprocates within a second tubular body attached to the first tubular body. The rigid member prevents the first and second sliders from rotating when the towing vehicle's pintle rotates. The second slider's end opposite to said attached rigid member is in contact with a pushrod that actuates a brake master cylinder attached to the aft end of the second tubular body. When the towing vehicle decelerates to such an extent that the trailer commences to overrun the towing vehicle, the first slider moves into the first tubular body, simultaneously forcing the second slider into the second tubular body while actuating the brake master cylinder and the trailer wheel brakes. The configuration of this invention also provides a sufficient load bearing surface area on the sliders to withstand heavy loads and the forces exerted by extreme jolts as the trailer travels fully loaded over very rough terrain at relatively high speeds.

Further objects, features, and advantages of the present invention will become apparent from the following description and drawings of the presently preferred embodiment of the invention.

DESCRIPTION OF THE PREFERRED EMBODIMENT

Figure 3:
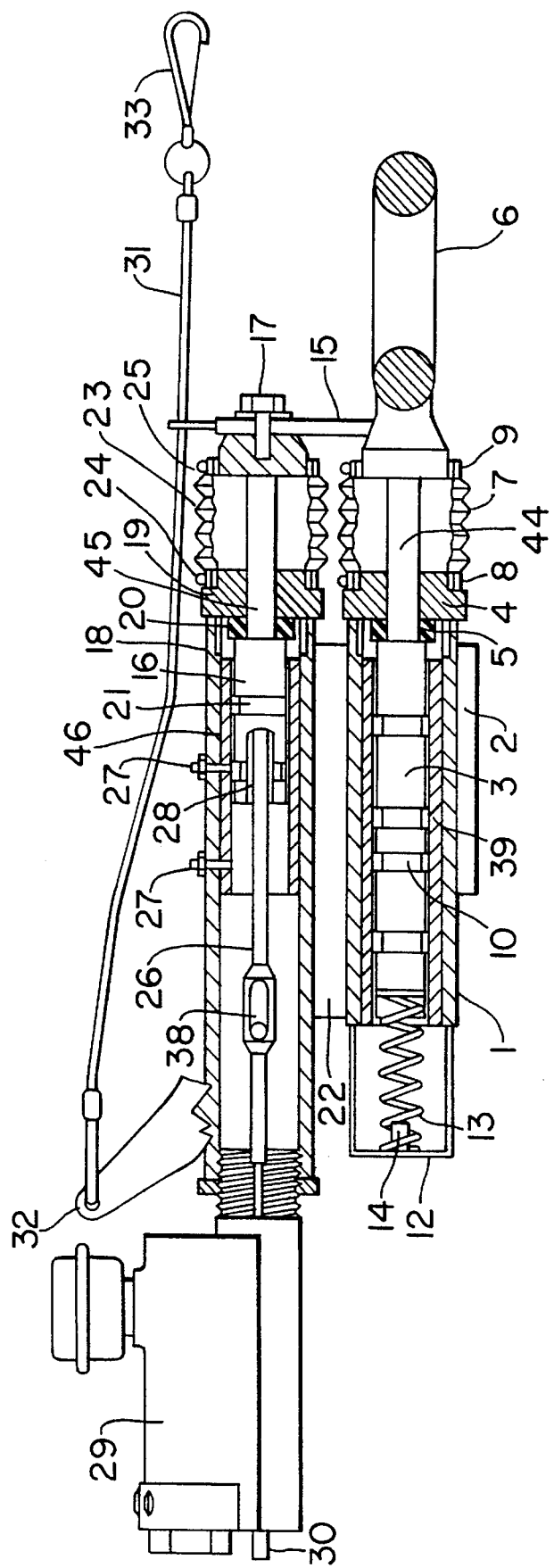
FIG. 3 is a side elevational view of the preferred embodiment of the invention without the shock absorbers and with the first and second tubular bodies partially cut away to show the details of the two slider assemblies.
Figure 4:
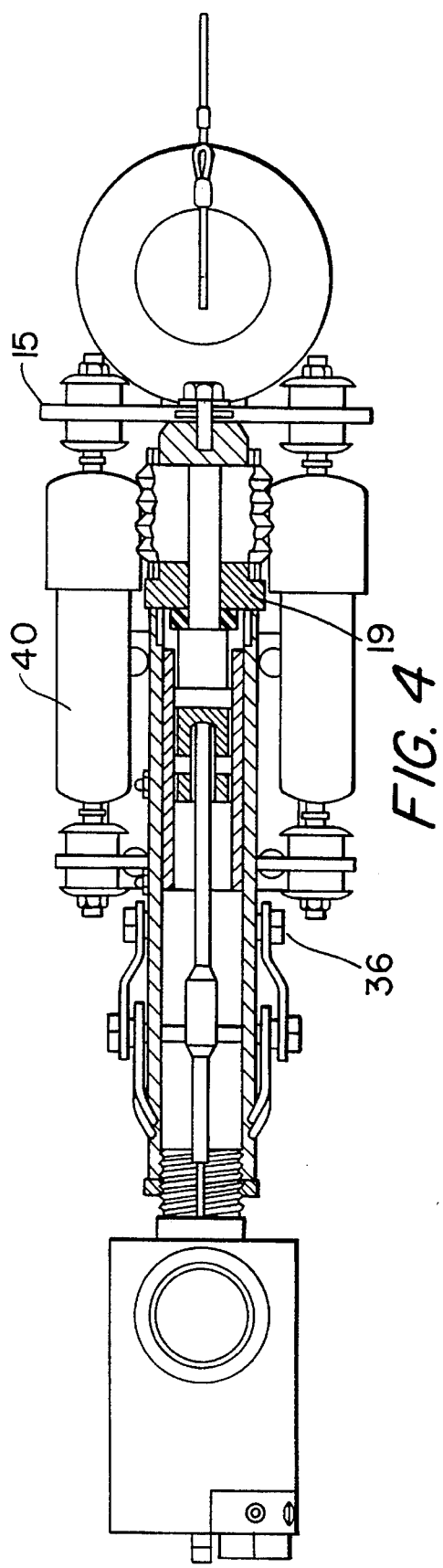
FIG. 4 is a top view of the preferred embodiment of the invention with the second tubular body partially cut away to show the details of the second slider assembly.
Figure 5:
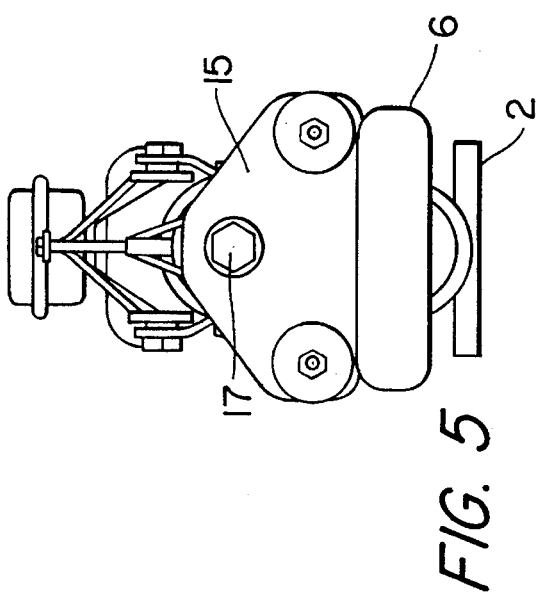
FIG. 5 is a front view of the preferred embodiment of the present invention.

The improved slider arrangement can best be seen by reference to FIG. 3, which depicts a side elevational view of the two tubular bodies partially cut away to show the details of the slider assemblies. A first rigid tubular body 1 is attached to the front of the trailer (not shown) longitudinally in relation to the axial length of the trailer by means of a rigid support member 2 affixed to the bottom of the first tubular body and attached to the trailer. The said support member 2 is welded to the first tubular body in the preferred embodiment, but may be affixed by other suitable means or could be an integral part of the first tubular body. The means for attaching the support member 2 to the trailer in the preferred embodiment is by bolts, but again other suitable means could be used.

A first rigid, solid cylinder slider 3 extends longitudinally inside the first tubular body 1. The first tubular body 1, the support member 2, and the first slider 3 in the preferred embodiment are constructed of steel alloy, although other materials could also be used which possess the necessary strength to withstand the rigors of heavy trailer loads traveling over rough terrain. The right end of the first slider 3 comprises a rod like extension 44 integral to the slider having a smaller diameter than the remainder of the slider. The rod like extension (44) extends snugly through a steel collar 4 that is securely attached to the right opening of the first tubular body by threads on the outer surface of the collar 4 and corresponding threads on the inside of the right end of the first tubular body. The collar 4 prevents the first slider from completely escaping from the first tubular body. A circular rubber washer like bumper pad 5 lies around the rod like extension 44. The bumper pad 5 prevents metal on metal contact when the larger diameter portion of the first slider abuts against the collar 4. The portion of the first slider 44 protruding from the right end of the first tubular body through the collar 4 terminates with a means for attaching the first slider to the towing vehicle (not shown). In the preferred embodiment, the means used for attaching the first slider to the towing vehicle is a forged steel lunette 6 (circular eye). The lunette 6 is welded to the first slider and the lunette attaches to a pintle (not shown) installed on the towing vehicle. This fastener was chosen because military vehicles are equipment with pintles for the attachment of trailers, but it is understood that the present invention includes other suitable means of attaching the first slider to the towing vehicle, which will be dependent upon the corresponding fastener installed on the towing vehicle.

An encircling cover (dust boot) 7 is disposed between the lunette 6 and the first tubular body 1 to protect the first slider from environmental elements, such as mud, dirt, and snow. The cover 7 in the preferred embodiment is a readily available commercial accordion rubber boot, but other suitable means are also encompassed by the present invention. The cover 7 is attached to the right end of the first tubular body by means of a suitable clamp fastener 8 on a lip of the collar 4 and at the other end to the first slider by another like suitable clamp 9. A low friction bearings means is located between the surface of the first slider 3 and the inside surface of the first tubular body 1, engaging both surfaces. In the preferred embodiment, the bearing means comprises one low friction circular brass bushing 39, but other bearing means are included within the present invention. In the preferred embodiment, the bushing 39 is lubricated with a suitable lubricant by means of apertures in the side of the first tubular body and the bushing 39 corresponding with attached grease plugs 11 (see FIG. 1). Circular grease pockets 10 are machined into the first slider within the first tubular body 1 to ensure even distribution of the lubricant. An end cap 12 is attached to the left end of the first tubular body. Inside the end cap 12 is a spring 13 with one end abutting against the right inside surface of the end cap 12. Said abutting spring end is held in place by a small nub 14 protruding from the end cap 12. The spring 13 extends longitudinally along the center axis of and into the first tubular body 1 and terminates by abutting against the left end of the first slider.

A rigid connecting member 15 extends upward from the first slider between the lunette 6 and clamp 9 and connects the first slider to a second rigid cylinder slider 16. The connecting member 15 in the preferred embodiment is constructed from steel alloy as is the second slider 16, but other suitable material may be used that can withstand vigorous jolts caused by moving the trailer over extremely rough terrain. In the preferred embodiment of the present invention, the connecting member 15 is affixed to the first slider 3 by welds and is attached to the second slider by a bolt 17 extending through the connecting member 15 into corresponding threads in the right end of the second slider. It is readily understood that the connecting member 15 could instead be integral to both the first and second sliders or attached to the said sliders by other suitable means.

The second slider 16 is of similar construction to the first slider 3. The second slider 16 extends longitudinally inside a second tubular body 18. The right end of the second slider 16 consists of a rod like extension 45 integral to the second slider having a smaller diameter than the rest of the slider. The rod like extension 45 snugly extends through a steel collar 19 that is securely attached to the right opening of the second tubular body by threads on the outer surface of the collar 19 and corresponding threads on the inside of the right end of the second tubular body prevents the second slider from completely escaping from the second tubular body. A circular rubber washer like bumper pad 20 lies around the rod like extension 45. The bumper pad 20 prevents metal on metal contact when the larger diameter portion of the second slider abuts against the collar 19. A low friction bearings means is located between the surface of the second slider 16 and the inside surface of the second tubular body 18 engaging both surfaces. In the preferred embodiment, the bearing means comprises one low friction circular brass bushing 46, but other bearing means are included within the present invention. In the preferred embodiment, the bushing 46 is lubricated with a suitable lubricant by means of apertures in the side of the second tubular body and bushing 46 with corresponding grease plugs 27 attached to the second tubular body. Circular grease pockets 21 are machined into the second slider to ensure that the lubricant is evenly distributed.

The second tubular body 18 lies above and longitudinally along the axis of the first tubular body 1. The second tubular body 18 is connected to the first tubular body 1 by means of a connecting member 22 that extends transversely and upward from the top of the first tubular body to the bottom of the second tubular body. The connecting member 22 in the preferred embodiment is attached to the first and second tubular bodies by welding, however other suitable means could be used and the connecting member 22 could also be integral to the first and second tubular bodies. The second sliding member 16, second tubular body 18, and connecting member 22 in the preferred embodiment are constructed of steel alloy, but it is understood that other rigid suitable means could also be used.

An encircling cover (dust boot) 23 over the second slider is disposed between the connecting member 15 and the right end of the second tubular body to protect the second slider from environmental elements (dirt, snow, and mud). The cover 23 in the preferred embodiment is a readily available commercial accordion rubber boot, but other suitable means are of course also encompassed by the present invention. The cover 23 is attached to the second tubular body by a suitable clamp fastener 24 on a lip on the collar 19 and at the other end to the second slider by another like suitable clamp 25.

Abutting against the end of the second slider inside the second tubular body is a rigid push rod 26 extending longitudinally along the center axis of the second tubular body. One end of the pushrod 26 abuts the second slider and is seated in a bore indentation 28 at the center of the left end of the second slider. The other end of the pushrod abuts against a piston or other means for actuating a brake master cylinder assembly 29 that is connected to the right end of the second tubular body 18 corresponding threads. In the preferred embodiment the brake master cylinder assembly 29 is a readily, commercially available brake master cylinder assembly capable of actuating the trailer brakes when the towing vehicle slows while moving in a forward direction, but also ensuring the brakes do not remain engaged when the towing vehicle is backing up. Such brake master cylinder assemblies are well known by those with ordinary skill in the art. Of course, the present invention can also be used with numerous other types of brake master cylinder assemblies.

From the above description, the operation of the present invention is readily apparent. Again referring to FIG. 3, when the trailer going in the forward direction commences to "outrun" the towing vehicle, the momentum of the trailer causes the first slider 3 to telescope into the first tubular body 1. The connecting member 15 connecting the first slider 3 and second slider 16 simultaneously causes the second slider 16 to slide into the second tubular body 18 and in turn forces the push rod 28 to actuate the brake master cylinder assembly 29 displacing fluid in the assembly through a port 30 in the assembly which is connected to hydraulic brakes on the trailer wheels (not shown). When the trailer slows sufficiently that the speed of the trailer is less than the speed of the towing vehicle, the first and second sliders telescope outward from the first and second tubular bodies respectively resulting in the pushrod 26 in the second tubular body deactuating the brake master cylinder assembly 29 thus releasing the pressure in the trailer brake system.

More important to the present invention, as the pintle on the towing vehicle rotates, the connection of the first and second sliders and the connection of the first and second tubular bodies prevents the sliders from rotating. Thus, the slider assemblies are not subject to uneven and premature wear and failure. Furthermore, the two slider assemblies configuration possesses in excess of three times as much proportional load bearing surface as the prior art one tube sliders tested. This additional surface area drastically increases the durability of the surge brake actuator.

Figure 1:
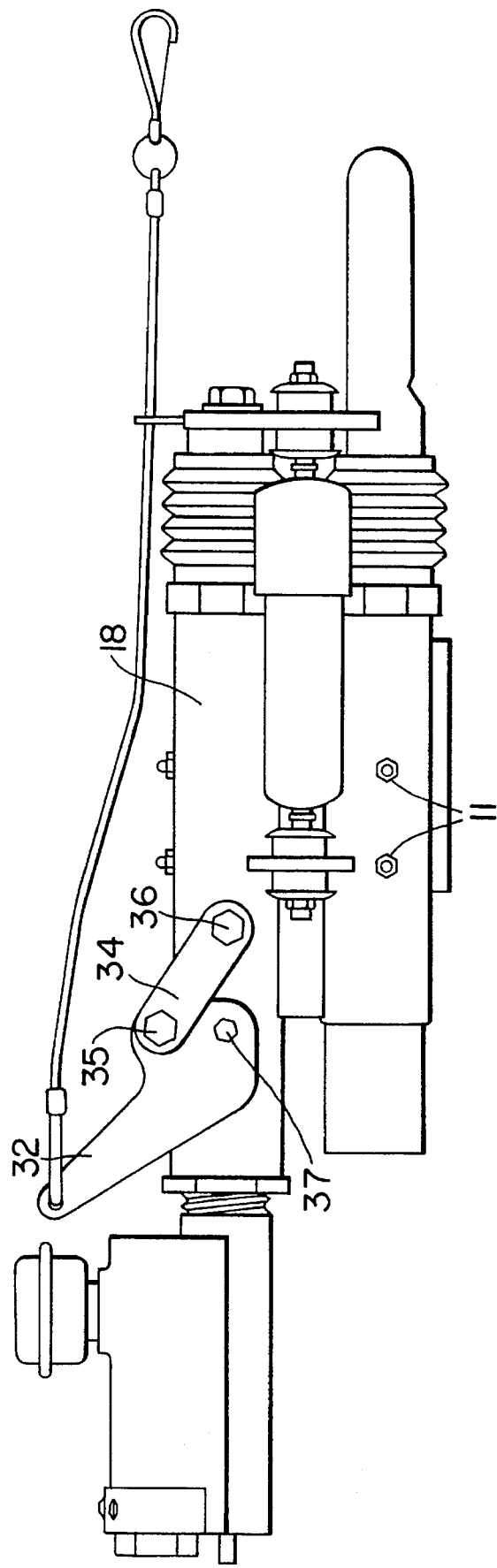
FIG. 1 is a side elevational view of the preferred embodiment of the invention.

Another feature of the preferred embodiment includes an added emergency breakaway feature. Referring to FIG. 3, the feature consists of a cable 31 attached at one end to the towing vehicle and at the other end to the upper portions of two cam levers 32 attached to the second tubular body 18. The cable 31 in the preferred embodiment is of steel construction, but any cable of sufficient tensile strength can be used. In the preferred embodiment, the cable 31 is attached to the towing vehicle by a steel hook 33, but any suitable fastening device is acceptable. One cam lever 32 is attached to each side of the second tubular body 18 in symmetrical relationship to each other. The cam levers 32 converge and join one another at their upper ends to which the cable 31 is attached. Referring to FIG. 1, each cam lever 32 is attached to a connecting member 34 by pivot studs 35 and the connecting member 34 extends obliquely downward. The other end of the connecting member 34 attaches to the side of the second tubular body with a pivot stud 36. A bolt 37 extends through elliptical apertures on both sides of the second tubular body and connects to the lower ends of the cam levers. The bolt 37 passes through an elliptical aperture 38 (depicted in FIG. 3) in a built up portion of the pushrod 26 aligned planarly with the apertures in the second tubular body. The bolt 37 terminates with a nut. If the trailer coupling becomes accidentally detached from the towing vehicle and the distance between the towing vehicle and the trailer exceeds the length of the cable 31, the cable becomes taut and pulls the cam levers 32 forward causing the bolt 37 to move rearward engaging the pushrod 26 and forcing said push rod to actuate the brake master cylinder and displacing fluid into the trailers brake system causing the trailer wheels to brake. When the cam levers 32 are in their normal nonengaged position, the elliptical aperture 38 in the pushrod ensures adequate longitudinal clearance so that the bolt 37 does not interfere with the normal operation of the second slider 16 and pushrod 26.

Figure 2:
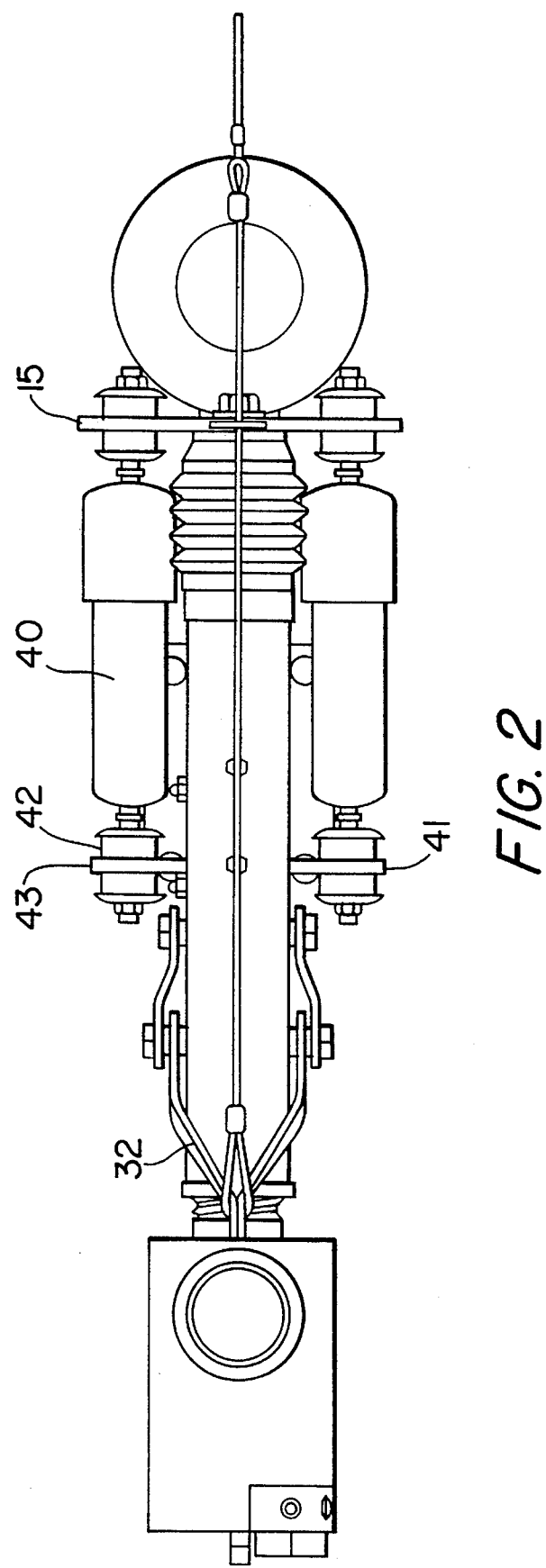
FIG. 2 is a top view of the preferred embodiment of the invention.

Another additional feature of the preferred embodiment incorporates hydraulic dampers in the form of automotive-type shock absorbers. As shown in FIG. 2, a pair of shock absorbers 40 is mounted parallel to the sides of the first and second tubular bodies 1 & 18 along their longitudinal axis. One shock absorber is mounted to each side of the tubular bodies. One end of each shock absorber is bolted to connecting member 15 that transverses between the shock absorbers. The other end of each shock absorber is bolted to steel supporting members 41 & 43 welded to and transversely extending from each side of the tubular bodies. Rubber bushings 42 that accompany commercially available automotive type shock absorbers are used when attaching the shock absorbers to the connecting member 15 and the supporting members 41 & 43.

As can be readily seen, the described invention not only provides a low maintenance, heavy duty surge brake actuator for trailers traveling over extremely rough terrain, but it also ensures that the slider assemblies do not rotate, thus eliminating premature and uneven wear on the sliders assemblies when attached to rotatable pintles on military towing vehicles. Still other modifications will become apparent to those skilled in the art from the foregoing description and appended drawings. Accordingly, the invention herein is not to be construed as being limited, except insofar as expressly provided or as the claims may require.

What is claimed:

1. A trailer surge brake actuator, comprising:

a rigid, circular, cylindrical first tubular body;

means for attaching said first tubular body to a trailer frame;

a rigid, circular, cylindrical first slider which reciprocates into said first tubular body;

low friction bearing means in contact with the surface of said first slider and an inside surface of said first tubular body;

means for attaching said first slider to a towing vehicle;

a rigid, circular, cylindrical second slider outside said first tubular body;

a rigid member connecting said first slider to said second slider;

a rigid, circular, cylindrical second tubular body into which said second slider reciprocates;

means for connecting said first tubular body to said second tubular body;

a master brake cylinder assembly connected to one end of said second tubular body; and a push rod extending longitudinally within said second tubular body with one end of said push rod abutting a piston of said master brake cylinder assembly.

2. A trailer surge brake actuator as recited in claim 1, further comprising a removable collar attached to an end of at least one of said tubular bodies, preventing the slider that reciprocates into that tubular body from completely escaping that tubular body to which said removable collar is attached.

3. A trailer surge brake actuator as recited in claim 1, wherein said first slider has a circular grease pocket.

4. A trailer surge brake actuator as recited in claim 2, wherein said first slider has a circular grease pocket.

5. A trailer surge brake actuator as recited in claims 1, 2, 3, or 4, wherein the diameter of said first slider which is in contact with said first bearing means is about the same as the diameter of said second slider which is in contact with said second bearing means.

6. A trailer surge brake actuator for use on a trailer connected to a towing vehicle with a rotatable pintle, comprising:

a rigid, circular, cylindrical first tubular body;

means for attaching said first tubular body to a trailer frame;

a rigid, circular, cylindrical first slider which reciprocates into said first tubular body;

a removable first collar attached to an end of said first tubular body, said first collar having a circular aperture through which said first slider extends;

a part of said first slider inside said first tubular body having a diameter larger than said aperture of said first collar;

means for attaching said first slider to a towing vehicle;

an encircling protective cover disposed between said first tubular body and said means for attaching said first slider to the towing vehicle;

low friction first bearing means disposed between the surface of said first slider and an inside surface of said first tubular body;

said first bearing means comprising low friction circular brass bushings extending substantially the length of the longitudinal axis of said first slider within said first tubular body;

grease plugs extending through the side of said first tubular body;

said first slider within said first tubular body having circular grease pockets;

a removable end cap attached to said first tubular body opposite to the end to which said first collar is attached;

a spring within said end cap with one end of said spring abutting said end cap;

said abutting spring held in place by a nub protruding from said end cap;

said spring extending longitudinally along the center axis of said first tubular body and terminating by abutting against said first slider;

a rigid, circular, cylindrical second slider;

a rigid member connecting said first slider to said second slider;

a second rigid, circular, cylindrical second tubular body into which said second slider reciprocates;

said second tubular body located above and parallel to the longitudinal axis of said first tubular body;

a removable second collar attached to an end of said second tubular body having a circular aperture through which said second slider extends;

said second slider inside said first tubular body having a diameter larger than said aperture of said second collar;

an encircling cover disposed between said second slider and said second tubular body;

low friction second bearing means disposed between the surface of said second slider and the inside surface of said second tubular body;

said second bearing means comprising low friction circular brass bushings extending substantially the length of the longitudinal axis of said second slider within said second tubular body;

the diameter of said first slider which is in contact with said first bearing means is about the same as the diameter of said second slider which is in contact with said second bearing means;

grease plugs extending through the side of said second tubular body;

said second slider within said second tubular body having circular grease pockets;

means for connecting said first tubular body to said second tubular body;

a master brake cylinder assembly removable connected to the end of said second tubular body opposite said second collar;

a push rod within said second tubular body having one end seated within a bore indentation of said second slider and extending longitudinally along the center axis of the second tubular body and the other end of said push rod abutting a piston of said master brake cylinder assembly;

emergency braking means for forcing said piston of said brake master cylinder into said brake master cylinder when said first slider inadvertently becomes detached from said towing vehicle; and a plurality of shock absorbers disposed along the longitudinal axis of said first tubular body with one end of each shock absorber connected to said sliders and the other end of each shock absorber connected to said tubular bodies.

* * * * *